United States Patent
Chang et al.

(10) Patent No.: US 6,770,685 B1
(45) Date of Patent: Aug. 3, 2004

(54) RESIN COMPOSITION FOR MANUFACTURING OPTICAL FIBER RIBBON AND METHOD FOR PREPARING RESIN FOR MANUFACTURING OPTICAL FIBER RIBBON USING THE SAME

(75) Inventors: Se-Lee Chang, Ansan (KR); Jung-Hyun Oh, Anyang (KR); Woo-Jeong Oh, Ansan (KR); Ki-Sung Jung, Ansan (KR)

(73) Assignee: SSCP Co., Ltd., Ansan (KR)

( * ) Notice: Subject to any disclaimer, the term of this patent is extended or adjusted under 35 U.S.C. 154(b) by 0 days.

(21) Appl. No.: 09/690,271

(22) Filed: Oct. 17, 2000

(30) Foreign Application Priority Data

Oct. 19, 1999 (KR) .......................................... 1999-45335

(51) Int. Cl.[7] .............................. C08F 2/46; C08L 75/16; C08G 18/40; C08G 18/61
(52) U.S. Cl. .............................. 522/8; 522/18; 522/39; 522/42; 522/44; 522/64; 522/97; 522/91; 522/96; 528/25; 528/26
(58) Field of Search .............................. 522/8, 39, 42, 522/44, 18, 64, 91, 96, 97, 90, 99, 170; 528/25, 26, 28; 385/114, 145; 428/378

(56) References Cited

U.S. PATENT DOCUMENTS

| | | | | |
|---|---|---|---|---|
| 5,712,035 A | * | 1/1998 | Ohtaka et al. | 428/378 |
| 5,787,218 A | * | 7/1998 | Ohtaka et al. | 385/123 |
| 5,908,873 A | * | 6/1999 | Shustack | 522/378 |
| 5,986,018 A | * | 11/1999 | Yamaguchi et al. | 524/379 |
| 6,023,547 A | * | 2/2000 | Tortorello | 385/114 |
| 6,110,593 A | * | 8/2000 | Szum et al. | 428/383 |
| 6,122,428 A | * | 9/2000 | Duecker | 385/115 |
| 6,298,189 B1 | * | 10/2001 | Szum et al. | 385/128 |
| 2001/0033725 A1 | * | 10/2001 | Szum et al. | 385/128 |

* cited by examiner

*Primary Examiner*—Susan Berman
(74) *Attorney, Agent, or Firm*—Fish & Richardson P.C.

(57) ABSTRACT

When a resin for manufacturing ultraviolet or electron ray curable optical fiber ribbon is prepared by properly mixing a photopolymerizable urethane acrylate oligomer containing polydimethylsiloxane, monomer, photoinitiator, leveling/defoaming agent, and antioxidant, optical loss caused by bending due to surface friction in the stacking process during ribbon bonding can be minimized by increasing tensile strength and surface slipping characteristics and by minimizing the shrinkage of resin when the it is cured.

16 Claims, 1 Drawing Sheet

US 6,770,685 B1

RESIN COMPOSITION FOR MANUFACTURING OPTICAL FIBER RIBBON AND METHOD FOR PREPARING RESIN FOR MANUFACTURING OPTICAL FIBER RIBBON USING THE SAME

CROSS REFERENCE TO RELATED APPLICATION

BACKGROUND OF THE INVENTION (a) Field of the Invention

The present invention relates to a resin composition for manufacturing optical fiber ribbon, more particularly to a resin composition for manufacturing optical fiber ribbon comprising a photopolymerizable urethane acrylate oligomer containing polydimethylsiloxane, a monomer, a photoinitiator, a leveling agent/defoaming agent, and an antioxidant in which optical loss after the ribbon manufacturing process can be minimized by increasing tensile strength and surface slipping characteristics, and by minimizing the shrinkage of resin while it is cured.

(b) Description of the Related Art

Recently, studies on a coating method using an ultraviolet ray curable resin have been actively pursued since it not only has short reaction time, high energy efficiency, and does not require a high temperature during curing compared to a method using a thermosetting resin, but it also has many merits in the aspects of productivity such as simplification of equipment and facilities.

On the other hand, technologies in which various processes are simultaneously carried out have been developed by adopting the ribbon process as a method in which the coated optical fiber is aligned. However, when an alkyl chain type manufacturing resin which has been conventionally used in the ribbon process, its surface slip cannot show 30 mN/m or more surface tension, and the shrinkage of coated resin is increased during curing so that a bending phenomena in which the ribbon bends in the force-receiving direction occurs because of the shrinking forces. The bending phenomenon has problems in that interference occurs to a straight light resulting in optical losses. Furthermore, bending also occurs when surface friction is generated since the ribbon is stacked in a slot process after the ribbon coating process. Although technologies have been developed which provide for surface slipping characteristics by coating talc on the surface in the general ribbon process in order to solve problems caused by the surface friction, the technologies have complicated problems in which an additional process is added.

SUMMARY OF THE INVENTION

It is an object of the present invention to provide a resin for manufacturing optical fiber ribbon in which optical losses can be minimized by increasing tensile strength and surface slipping characteristics and minimizing the resin shrinkage during curing in order to solve the problems.

It is another object of the present invention to provide a resin composition used in preparing the resin and a preparation method for the resin.

In order to accomplish the objects, the present invention provides a resin composition for manufacturing optical fiber ribbon comprising a) a photopolymerizable urethane acrylate oligomer containing polydimethylsiloxane (hereinafter referred to as "PDMS"), b) a monomer, c) a photoinitiator, d) a leveling agent/defoaming agent, and e) an antioxidant.

Furthermore, the present invention provides a preparation method for manufacturing optical fiber ribbon in which the resin composition for manufacturing optical fiber ribbon is used.

Furthermore, the present invention provides a resin for manufacturing optical fiber manufactured by the resin preparation method for manufacturing optical fiber ribbon.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
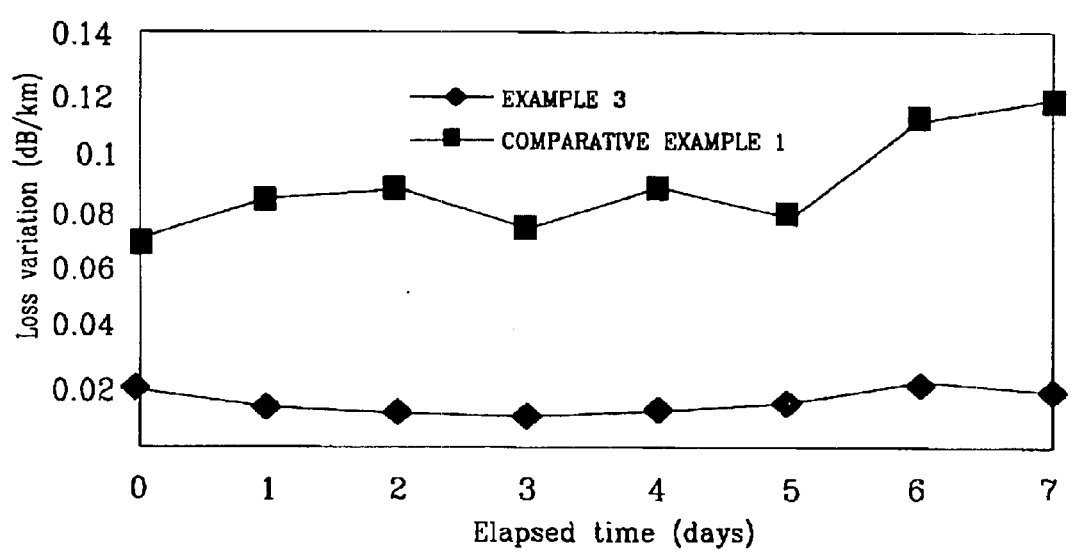
FIG. 1 shows variation of optical losses according to elapsed time after the ribbon coating process.

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

The present invention is described in detail as follows.

A photopolymerizable urethane acrylate oligomer containing polydimethylsiloxane used in the present invention, as a photopolymerizable oligomer providing for surface slipping characteristics, is preferably synthesized with a photopolymerizable urethane acrylate oligomer composition comprising a) a polyol compound with a polydimethylsiloxane structure, b) a polyol, c) polyisocyanate, d) acrylate alcohol, e) a urethane reaction catalyst, and f) a polymerization inhibitor. The photopolymerizable urethane acrylate oligomer containing polydimethylsiloxane preperably comprises 50 to 80 weight % of the resin composition for manufacturing optical fiber ribbon. The increase of shrinkage results in an increase of optical losses due to microbending in the case when there is less than 50 weight % of the resin composition, while viscosities are increased such that there are problems in operation when the resin composition exceeds 80 weight %.

The a) polyol compound with a polydimethylsiloxane structure in the photopolymerizable urethane acrylate oligomer composition is used so as to provide surface slipping characteristics by employing a —SiO— functional group in an oligomer chain. Preferably, PDMS polyol having a molecular weight between 100 and 10,000 is used. The basic structure of PDMS is represented in the following Chemical Formula 1:

[Chemical Formula 1]

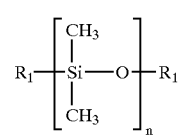

where $R_1$ is selected from the group consisting of ethanol, propanol, butanol, and pentanol, and n is an integer from 1 to 140.

Preferably, the PDMS polyol is selected from the group consisting of Hsi 2111 (hydroxy-terminated polydimethylsiloxane, manufactured by Tego Chemical Company), 1,3-bis(hydroxybutyl)tetramethyldisiloxane, 1,4-bis(hydroxypropyl)tetramethyldisiloxane, and a mixture thereof, and is used in an amount of 5 to 25 weight % of the photopolymerizable urethane acrylate oligomer composition.

Furthermore, the b) polyol preferably has a molecular weight of 100 to 10,000, preferably comprises a repeat unit of —$CH_2CH_2O$— or —$CH_2CH(CH_2CH_3)O$—, and is preferably selected from the group consisting of polyester polyol, polyether polyol, polycarbonate polyol, polycaprolactone polyol, tetrahydrofuran propyleneoxide ring opening copolymer, ethylene glycol, propylene glycol, 1,4-butanediol, 1,5-pentanediol, 1,6-hexanediol, neopentyl glycol, 1,4-cyclohexane diimethanol, bisphenol A, bisphenol F type diol, and a mixture thereof. The polyol preferably comprises 5 to 30 weight % of the photopolymerizable urethane acrylate oligomer composition. More preferably, 10 to 15 weight % of polyester polyol or polycaprolactone polyol, tetrahydrofuran propyleneoxide ring opening copolymer is used.

Furthermore, the c) polyisocyanate is preferably selected from the group consisting of 2,4-tolylenediisocyanate, 2,6-tolylenediisocyanate, 1,3-xylenediisocyanate, 1,4-xylenediisocyanate, 1,5-naphthalene diisocyanate, 1,6-hexanediisocyanate, isophorone diisocyanate, and a mixture thereof, and is preferably used in an amount of 20 to 40 weight % of the photopolymerizable urethane acrylate oligomer composition.

Furthermore, the d) acrylate alcohol, as a compound comprising one or more of acrylate or methacrylate and hydroxyl groups, is preferably selected from the group consisting of 2-hydroxyethyl methacrylate, 2-hydroxypropyl methacrylate, 2-hydroxybutyl methacrylate, 2-hydroxyethyl acrylate, 2-hydroxypropyl acrylate, 2-hydroxy-3-phenyloxypropyl methacrylate, 4-hydroxybutyl acrylate, neopentylglycol monomethacrylate, 4-hydroxycyclohexyl methacrylate, 1,6hexanediol monomethacrylate, pentaerythritolpentamethacrylate, dipentaerythritolpentamethacrylate, and a mixture thereof, and is preferably used in an amount of 20 to 35 weight % of the photopolymerizable urethane acrylate oligomer composition.

Furthermore the e) urethane reaction catalyst, a small amount of which is added during the urethane reaction, is preferably selected from the group consisting of copper naphthenate, colbalt naphthenate, zinc naphthate, n-butyltinlaurate, tristhylamine, 2-methyltriethylenediamide, and a mixture thereof, and is preferably used in an amount of 0.01 to 1 weight % of the photopolymerizable urethane acrylate oligomer composition.

Furthermore, the f) polymerization inhibitor is preferably selected from the group consisting of hydroquinone, hydroquinone monomethylether, para-benzoquinone, phenothiazine, and a mixture thereof, and is preferably used in an amount of 0.01 to 1 weight % of the photopolymerizable urethane acrylate oligomer composition.

A method for synthesizing the photopolymerizable urethane acrylate oligomer containing polydimethylsiloxane from the photopolymerizable urethane acrylate oligomer composition is as follows. The polyol, polyol compound comprising PDMS structure, and polymerization initiator are put into a reactor and pressure is reduced over 760 mmHg for 30 minutes so that moisture can be removed. This is for removing the possibility of side reactions between moisture and isocyanate. After maintaining the moisture removed mixture at a temperature of 40 to 65° C., polyisocyanate is added to the mixture, it is stirred at 200 to 300 rpm, and ⅓ of the total catalyst is added. Precautions should be taken since severe heat is generated at this time. The reactant is reacted until —OH peaks on the IR scale have disappeared by maintaining a temperature of 50 to 75° C. after the exothermic reaction. Reaction time is approximately 2 to 3 hours. Acrylate alcohol is then added to the reactant after the reaction, and remained catalysts are also added. Precautions should be taken since severe heat is also generated at this time. The photopolymerizable urethane acrylate oligomer is obtained by reacting the reactant until —NCO peaks on the IR scale have disappeared by increasing the temperature to 60 to 80° C. after the exothermic reaction.

A monomer having a low molecular weight is used to adjust the viscosities since a photopolymerizable monomer which is used together with the oligomer compound in the present invention has a polymer structure. The monomer has a structure in which one or more of acrylate groups, methacrylate or vinyl groups are in a molecular structure. Although various types of monomers are available that have varieties of functional groups from 1 to 3 or more, the monomer that has a higher modulus on a film as well as a lower shrinkage in the present invention is preferably selected from the group consisting of phenoxyethylacrylate, phenoxydiethylene glycol acrylate, phenoxytetraethylene glycol acrylate, phenoxyhexaethylene glycol acrylate, isobornyl acrylate (IBOA), isobornmyl methacrylate, N-vinylpyrrolidone (N—VP), bisphenol ethoxylate diacrylate, ethoxylate phenol monoacrylate, polyethylene glycol 200 diacrylate, tripropylene glycol diacrylate, trimethylolpropane triacrylate (TMPTA), polyethyleneglycol diacrylate, ethoxlated trimethylolpropane triacrylate (EO-TMPTA), pentaerythritol tetraacrylate (PETA), 1,4-butanediol diacrylate, 1,6-hexanediol diacrylate, ethoxylated pentaerythritol tetraacrylate, 2-phenoxyethyl acrylate, ethoxylated bisphenol A diacrylate, and a mixture thereof. Furthermore, the monomer preferably comprises 15 to 50 weight % of the resin composition for manufacturing optical fiber ribbon. It is difficult to dilute a highly viscous oligomer compound to a viscosity of 5,000 to 8,000 cps (at 25° C.) when an input amount of the monomer is less than 15 weight %, while there is a risk of optical losses due to bending caused by an increase of the film shrinkage during curing when an input amount of the monomer exceeds 50 weight %.

Furthermore, a photoinitiator of the present invention is added so as to make the resin cure quickly when the optical fiber coating is done at a fast line speed of 300 m/min or more. The photoinitiator forms free radicals by receiving ultraviolet energy, and it attacks double bonds in the resin thus induces polymerization. The photoinitiator is preferably selected from the group consisting of IRGACURE #184 (1-hydroxy-cyclohexyl-phenyl-ketone, manufactured by CibaGeigy), IRGACURE #907 (2-methyl-1((4-(methylthio)phenyl)-2-morpholinopropan-1-one, manufactured by CibaGeigy), IRGACURE #500 (a mixture of IRGACURE #184 and benzophenone, manufactured by CibaGeigy), IRGACURE #651 (2,2-dimethoxy-1,2-diphenylethane-1-one, manufactured by CibaGeigy), DAROCURE #1173 (2-hydroxy-2-methyl-1-phenyl-propan-1-one, manufactured by Merk), CGI #1800 (a mixture of bis(2,6-dimethoxybenzoyl)-2,4,4-trimethyl-phenyl-pentylphosphineoxide and IRGACURE #184, manufactured by CibaGeigy), and CGI #1700 (a mixture of bis(2,6-dimethoxybenzoyl)-2,4,4-trimethyl-phenyl-pentylphosphineoxide and IRGACURE #1173, manufactured by CibaGeigy), and preferably comprises 3 to 15 weight % of the resin composition for manufacturing optical fiber ribbon.

Furthermore, the present invention comprises a leveling/defoaming agent, antioxidant, etc. as additives. Both silicone type and fluorine type additives can be used. Preferably, a silicone based additive is used in the present invention since a fluorine type additive generates a larger amount of bubbles than a silicone type additive does due to its low surface tension, and it is difficult to remove formed bubbles. There are two types of additives, including one type which comprises a molecular acrylate or vinyl group which participates in curing, and another type which emerges on the surface of the resin due to non-reactivity and thus exercises its effects. The material which plays a role as a leveling/defoaming agent is preferably selected from the group consisting of BYK #371 (an acrylated polydimethylsiloxane type leveling agent, manufactured by BYK Chemical Company), BYK #353 (a polyacrylate type leveling agent, manufactured by BYK Chemical Company), BYK #356 (a polyacrylate type leveling agent, manufactured by BYK Chemical Company), BYK #359 (a polyacrylate copolymer leveling agent, manufactured by BYK Chemical Company), BYK #361 (a polyacrylate copolymer leveling agent, manufactured by BYK Chemical Company), BYK #067 (a polysiloxane type defoaming agent, manufactured by BYK Chemical Company), BYK #141 (a polysiloxane type defoaming agent, manufactured by BYK Chemical Company), TEGO RAD #2200 (an acrylated polyester siloxane copolymer, manufactured by Tego Chemical Company), TEGO RAD #2500 (an acrylated polyester siloxane copolymer, manufactured by Tego Chemical Company), TEGO RAD #410 (a polyester siloxane copolymer, manufactured by Tego Chemical Company), TEGO RAD #435 (a polyester siloxane copolymer, manufactured by Tego Chemical Company), and TEGO GLIDE #453 (a polyester siloxane copolymer, manufactured by Tego Chemical Company), and preferably comprises 0.1 to 5 weight % of the resin composition for manufacturing optical fiber ribbon. Particularly, Tego Glide series are effective in providing surface slipping characteristics employed in the resin along with the silicone employed oligomer.

Furthermore, a phenol based additive is mainly used as an antioxidant which protects the physical properties of a formed film from being deteriorated due to corrosion caused by oxidation, and it is preferably used in an amount of about 0.1 to 5 weight % of the resin composition for manufacturing optical fiber ribbon. More preferably, the antioxidant is selected from the group consisting of IRGANOX 1010 (pentaerythritol tetrakis(3-(3,5-di-tert-butyl-4-hydroxyphenyl)propionate), manufactured by CibaGeigy), IRGANOX 1035 (pentaerythritol tetakis(3-(3,5-di-tert-butyl-4hydroxyphenyl)propionate), manufactured by CibaGeigy), IRGANOX 1076 (octadecyl-3-(3,5-di-tert.butyl-4-hydroxyphenyl)-propionate, manufactured by CibaGeigy), and a mixture thereof.

Furthermore, the present invention provides a preparation method of resin for manufacturing optical fiber ribbon in which the photopolymerizable resin composition is used.

Preparation methods of resin for manufacturing optical fiber ribbon can be usually used with a resin composition for manufacturing optical fiber ribbon comprising the photopolymerizable urethane acrylate oligomer, reaction monomer, photoinitiator, leveling/defoaming agent, and antioxidant. One example of the preparation methods includes a method in which the compositions are mixed in a reactor and reacted while stirring the mixture at a rate of 500 to 1,000 rpm under the conditions of a temperature of 15 to 50° C. and a humidity of 60% or less. Oligomer viscosities are increased causing problems with the process when a mixing temperature is less than 15° C., while reaction initiators form radicals thus causing a curing reaction when a mixing temperature exceeds 50° C. Furthermore, a resin prepared by the reaction produces bubbles in a subsequent coating process, and non-reacted —NCO are reacted with moisture in air resulting in a formation of side reactions when humidity exceeds 60% during mixing. Furthermore, the compound is not well mixed when the agitation rate of the compound is less than 500 rpm, while heat is generated during the agitation process destroying reaction initiators when the agitation rate of the compound exceeds 1,000 rpm.

A resin for manufacturing optical fiber ribbon having 23 dyne/cm$^2$ or less surface tension can be prepared without the talc process for providing the surface slipping characteristics in a preparation method of resin for manufacturing optical fiber ribbon according to the present invention, in which slipping characteristics are given to the composition itself.

Furthermore, the present invention provides a resin for manufacturing optical fiber ribbon manufactured by the preparation method, wherein film frictions of the resin for manufacturing optical fiber ribbon are greatly decreased compared to a conventional resin for manufacturing optical fiber ribbon, a surface tension is 27 dyne/cm$^2$ or less when measured using a surface tension measuring instrument manufactured by BYK Corporation, and shrinkage during curing is 7.2% or less when measured by the ASTM (American Society for Testing and Materials) D-792 method.

The invention will be further explained by the following non-limiting examples.

EXAMPLE 1

Preparation of Oligomer

After mixing 131.9 g of PDMS based diol Hsi-2111, 146.5 g of tetrahydrofuran propyleneoxide ring opening diol (molecular weight of 1,000), 237.36 g of polycaprolactone polyol (Tone Polyol), and 529.04 g of isophorone diisocyanate (IPDI) in a 2 l flask and increasing the temperature to 40 to 50° C., 1 g of n-butyltinlaurate (DBTL) was added to the mixture. After the exothermic reaction, the reactant was reacted by maintaining a temperature of 50 to 70° C. until —OH peaks disappeared. When —OH peaks had completely disappeared on the IR scale, 2.25 g of hydroquinone monomethyl ether (HQMME) and 433.33 g of 2-hydroxypropyl acrylate (2-HPA) were added, and then 2 g of n-butyltinlaurate were added. After the exothermic reaction, the reactant was reacted by maintaining a temperature of 60 to 75° C. until —NCO peaks on the IR scale had completely disappeared.

EXAMPLE 2

Preparation of Oligomer

After mixing 146.3 g of Hsi-2111, 114.6 g of isobutanediol, 263.5 g of polycaprolactone polyol, and 587.2 g of isophorone diisocyanate in a 2 l flask and increasing the temperature to 40 to 50° C., 1 g of n-butyltinlaurate was added to the mixture. After the exothermic reaction, the reactant was reacted by maintaining a temperature of 50 to 70° C. until —OH peaks disappeared. When —OH peaks had completely disappeared on the IR scale, 2.25 g of hydroquinone monomethyl ether and 480.96 g of 2-hydroxypropyl acrylate were added, and then 2 g of n-butyltinlaurate were added. After the exothermic reaction, the reactant was reacted by maintaining a temperature of 60 to 75° C. until —NCO peaks on the IR scale had completely disappeared.

EXAMPLE 3

Preparation of Oligomer

After mixing 295.9 g of Hsi-2111, 266.35 g of polycaprolactone polyol, and 593.6 g of isophorone diisocyanate in a 2 l flask and increasing the temperature to 40 to 50° C., 1 g of n-butyltinlaurate was added to the mixture. After the exothermic reaction, the reactant was reacted by maintaining a temperature of 50 to 70° C. until —OH peaks disappeared. When —OH peaks had completely disappeared on the IR scale, 2.25 g of hydroquinone monomethyl ether and 486.2 g of 2-hydroxypropyl acrylate were added, and then 2 g of n-butyltinlaurate were added. After the exothermic reaction, the reactant was reacted by maintaining a temperature of 60 to 75° C. until —NCO peaks on the IR scale had completely disappeared.

EXAMPLE 4

Preparation of Oligomer

After mixing 94.07 g of 1,4-bis(hydroxymethyl)benzene, 366.55 g of polycaprolactone polyol, and 750.46 g of isophorone diisocyanate in a 2 l flask and increasing the temperature to 40 to 50° C., 1 g of n-butyltinlaurate was added to the mixture. After the exothermic reaction, the reactant was reacted by maintaining a temperature of 50 to 70° C. until —OH peaks disappeared. When —OH peaks had completely disappeared on the IR scale, 2.25 g of hydroquinone monomethyl ether and 614.5 g of 2-hydroxypropyllaurate were added, and then 2 g of n-butyltinlaurate were added. After the exothermic reaction, the reactant was reacted by maintaining a temperature of 60 to 75° C. until —NCO peaks on the IR scale had completely disappeared.

EXAMPLE 5

Preparation of Oligomer

After mixing 114.35 g of 1,3-bis(hydroxybutyl)tetramethyldisiloxane, 332.5 g of polycaprolactone polyol, and 741.5 g of isophorone diisocyanate in a 2 l flask and increasing the temperature to 40 to 50° C., 1 g of n-butyltinlaurate was added to the mixture. After the exothermic reaction, the reactant was reacted by maintaining a temperature of 50 to 70° C. until —OH peaks disappeared. When —OH peaks had completely disappeared on the IR scale, 2.25 g of hydroquinone monomethyl ether and 417.5 g of 2-hydroxypropyllaurate were added, and then 2 g of n-butyltinlaurate were added. After the exothermic reaction, the reactant was reacted by maintaining a temperature of 60 to 75° C. until —NCO peaks on the IR scale had completely disappeared.

EXAMPLE 6

Preparation of Oligomer

After mixing 103.7 g of 1,4-bis(hydroxypropyl)tetramethyldisiloxane, 335 g of polycaprolactone polyol, and 178 g of isophorone diisocyanate in a 2 l flask and increasing the temperature to 40 to 50°C., 1 g of n-butyltinlaurate was added to the mixture. After the exothermic reaction, the reactant was reacted by maintaining a temperature of 50 to 70° C. until —OH peaks disappeared. When —OH peaks had completely disappeared on the IR scale, 2.25 g of hydroquinone monomethyllaurate and 605 g of 2-hydroxypropyllaurate were added, and then 2 g of n-butyltinlaurate were added. After the exothermic reaction, the reactant was reacted by maintaining a temperature of 60 to 75° C. until —NCO peaks on the IR scale had completely disappeared.

EXAMPLE 7

Preparation of Oligomer

After mixing 90 g of diphenylsilanediol, 340 g of polycaprolactone polyol, and 755 g of isophorone diisocyanate in a 2 l flask and increasing the temperature to 40 to 50° C., 1 g of n-butyltinlaurate was added to the mixture. After the exothermic reaction, the reactant was reacted by maintaining a temperature of 50 to 70° C. until —OH peaks disappeared. When —OH peaks had completely disappeared on the IR scale, 2.25 g of hydroquinone monomethyl ether and 615 g of 2-hydroxypropyl acrylate were added, and then 2 g of n-butyltinlaurate were added. After the exothermic reaction, the reactant was reacted by maintaining a temperature of 60 to 75° C. until —NCO peaks on the IR scale had completely disappeared.

EXAMPLE 8

Preparation of Resin for Manufacturing Optical Fiber Ribbon

A resin for manufacturing optical fiber ribbon was prepared by mixing 60 weight % of oligomer prepared in the EXAMPLES 1 to 7, 15 weight % of isobomyl acrylate, 10 weight % of N-vinylpyrrolidone, 8 weight % of photoinitiator, and 7 weight % of additive.

COMPARATIVE EXAMPLE 1

After pouring 0.4 mole of polytetramethylene glycol (molecular weight of 1,000) and 0.6 mole of polycaprolactone polyol into a reactor, the material was dehydrated under vacuum at a temperature of 80 to 100° C. for 20 to 40 minutes so that, excepting a urethane reaction, side reactions caused by moisture in the material could not occur. After the dehydration process, it was cooled to 60° C., and 2.6 moles of isophorone diisocyanate were added to the reactant. The exothermic reaction was carried out at a temperature of 50 to 90° C. or less by adding 200 ppm of the catalyst dibutyltinlaurate. After maintaining the first reaction at a temperature of 50 to 80° C. for 1 to 2 hours in and adding 400 ppm of hydroquinone and 3 moles of 2-hydroxypropyl acrylate, 400 ppm of dibutyltinlaurate were added to the reactant after the exothermic reaction. It was reacted by maintaining a temperature of 70 to 80° C. until —NCO peaks had completely disappeared on the IR scale. A resin for manufacturing optical fiber ribbon was prepared using the oligomer produced by the reaction in the same method as in EXAMPLE 8.

COMPARATIVE EXAMPLE 2

A resin for manufacturing optical fiber ribbon was prepared in the same method as in EXAMPLE 8 using a polyester based oligomer which was widely used as a conventional resin for manufacturing optical fiber ribbon.

TEST EXAMPLE 1

Surface Friction Force Test of a Resin for Manufacturing Optical Fiber Ribbon

In order to determine surface friction force of a resin for manufacturing optical fiber ribbon prepared in EXAMPLE 8 and a resin for manufacturing optical fiber ribbon synthesized in COMPARATIVE EXAMPLE 1, liquid phase surface tensions and friction forces were tested on a film, and the results of tests are represented in the following Table 1. Surface tensions were measured using a surface tension measuring instrument of BYK Corporation, while friction forces were measured by an ordinary method, i.e., measuring a force pulling a 500 g of weight on the surface of a film.

TABLE 1

| Classification | COM. EXAMPLE 1 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| Friction force ($\times 10^{-3}$ kgf) | 288 | 240 | 208 | 155 | 230 | 200 | 210 | 235 |
| Surface tension (dyne/cm$^2$) | 32 | 27 | 25 | 21 | 26 | 23 | 25 | 26 |

As can be seen from Table 1, not only did a friction force of a film manufactured with oligomer of EXAMPLES 1 to 7, being from 155 to 240×10$^{-3}$ kgf), greatly decrease compared to 288 of COMPARATIVE EXAMPLE 1, but also a surface tension thereof was greatly decreased compared to 32 dyne/cm$^2$ of COMPARATIVE EXAMPLE 1. So, it can be found that both film friction force and surface tension were greatly improved.

TEST EXAMPLE 2

Tensile Strength Test of a Resin for Manufacturing Optical Fiber Ribbon

In order to determine tensile strengths of a resin for manufacturing optical fiber ribbon prepared in EXAMPLE 8 and a resin for manufacturing optical fiber ribbon synthesized in COMPARATIVE EXAMPLE 2, tensile strengths were tested on fully cured film at ordinary temperature according to the ASTM D-638 method using a tensile strength measuring instrument (Instron-4443), and the results of tests are represented in the following Table 2.

TABLE 2

| Classification | COM. EXAMPLE 2 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| Tensile strength (kgf/mm$^2$) | 71 | 83 | 86 | 90 | 100 | 95 | 98 | 105 |

As can be seen from Table 2, it can be found that the tensile strength of a resin for manufacturing optical fiber ribbon according to the present invention, 83 to 105 kgf/mm$^2$, was remarkably higher that of 71 kgf/mm$^2$ of COMPARATIVE EXAMPLE 2, i.e., a conventional resin for manufacturing ribbon.

TEST EXAMPLE 3

Shrinkage Test of a Resin for Manufacturing Optical Fiber Ribbon

In order to determine shrinkage of a resin for manufacturing optical fiber ribbon prepared in EXAMPLE 8 and a resin for manufacturing optical fiber ribbon synthesized in COMPARATIVE EXAMPLE 2, shrinkages were tested according to the ASTM D-792 method, and the results of tests are represented in the following Table 3.

As can be seen from Table 3, the shrinkage of a resin for manufacturing optical fiber ribbon according to the present invention, 6.8 to 7.2%, was remarkably lower than that of 8.5% of COMPARATIVE EXAMPLE 2.

TEST EXAMPLE 4

Attenuation Test

In order to measure optical attenuation effects of a resin of the present invention for manufacturing optical fiber ribbon having a high shrinkage and tensile strength, and good surface slipping characteristics, variation values of optical loss were measured according to elapsed time after introducing into each bonding process a resin for manufacturing optical fiber ribbon prepared using the oligomer of EXAMPLE 3 and a resin for manufacturing optical fiber ribbon of COMPARATIVE EXAMPLE 1. Optical losses were measured at a wavelength of 1.55 μm, and the test results are shown in FIG. 1 as a graph.

It can be seen from the graph that optical loss values of COMPARATIVE EXAMPLE 1 and EXAMPLE 1 show a 3 or more times difference. Furthermore, it can be found that variation values of optical losses between initial time and 8 day elapsed time are almost nonexistent in the case of EXAMPLE 3, while the optical losses leap to nearly 2 times in the case of COMPARATIVE EXAMPLE 1. The test results show that optical loss values of a resin for coating optical fiber ribbon of the present invention in which polydimethylsiloxane groups are employed were remarkably lower than those of the conventional resin for manufacturing optical fiber ribbon.

As can be seen in the above, a resin prepared from a resin composition for manufacturing optical fiber ribbon of the present invention can increase tensile strength and surface

TABLE 3

| Classification | COM. EXAMPLE 2 | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| Shrinkage (%) | 8.5 | 6.8 | 7.0 | 7.2 | 7.2 | 6.8 | 7.0 | 7.2 | slipping characteristics, and minimize optical losses by minimizing the shrinkage of resin during the curing process.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A resin composition for manufacturing optical fiber ribbon comprising
   a) a photopolymerizable urethane acrylate oligomer containing polydimethylsiloxane;
   b) a monomer;
   c) a photoinitiator;
   d) a leveling/defoaming agent; and
   e) an antioxidant;
   wherein the photopolymerizable urethane acrylate oligomer containing polydimethylsiloxane is synthesized from a composition comprising
      i) a first polyol compound containing polydimethylsiloxane and selected from the group consisting of hydroxy-terminated polydimethylsiloxane, 1,3-bis(hydroxybutyl)tetramethyldisiloxane, 1,4-bis(hydroxypropyl)tetramethyldisiloxane, and a mixture thereof,
      ii) a second polyol compound,
      iii) a polyisocyanate,
      iv) an acrylate alcohol,
      v) a urethane reaction catalyst, and
      vi) a polymerization inhibitor,
   wherein the first polyol compound containing polydimethylsiloxane is in an amount of 5 to 25 weight % of the photopolymerizable urethane acrylate oligomer composition; and the second polyol compound has a molecular weight of 100 to 10,000; is selected from the group consisting of polyester polyol, polycarbonate polyol, polycaprolactone polyol, tetrahydrofuran propyleneoxide ring opening copolymer, ethylene glycol, propylene glycol, 1,4-butanediol, 1,5-pentanediol, 1,6-hexanediol, neopentyl glycol, 1,4-cyclohexane dimethanol, bisphenol A, bisphenol F diol, and a mixture thereof; and comprises 5 to 30 weight % of the photopolymerizable urethane acrylate oligomer composition.

2. A resin composition for manufacturing optical fiber ribbon according to claim 1, wherein the polyisocyanate is selected from the group consisting of 2,4-tolylenediisocyanate, 2,6-tolylenediisocyanate, 1,3-xylenediisocyanate, 1,4-xylenediisocyanate, 1,5-naphthalene diisocyanate, 1,6-hexanediisocyanate, and isophorone diisocyanate, and is used in an amount of 20 to 40 weight % of the photopolymerizable urethane acrylate oligomer composition.

3. A resin composition for manufacturing optical fiber ribbon according to claim 1, wherein the acrylate alcohol is selected from the group consisting of 2-hydroxyethyl methacrylate, 2-hydroxypropyl methacrylate, 2-hydroxybutyl methacrylate, 2-hydroxyethyl acrylate, 2-hydroxypropyl acrylate, 2-hydroxy-3-phenyloxypropyl methacrylate, 4-hydroxybutyl acrylate, neopentylglycol monomethacrylate, 4-hydroxycyclohexyl methacrylate, 1,6-hexanediol monomethacrylate, pentaerythritolpentamethacrylate, dipentaerythritolpentamethacrylate, and a mixture thereof, and comprises 20 to 35 weight % of the photopolymerizable urethane acrylate oligomer composition.

4. A resin composition for manufacturing optical fiber ribbon according to claim 1, wherein the urethane reaction catalyst is selected from the group consisting of copper naphthenate, cobalt naphthate, zinc naphthate, n-butyltinlaurate, tristhylamine, 2-methyltriethylenediamide, and a mixture thereof, and comprises 0.01 to 1 weight % of the photopolymerizable urethane acrylate oligomer composition.

5. A resin composition for manufacturing optical fiber ribbon according to claim 1, wherein the polymerization inhibitor is selected from the group consisting of hydroquinone, hydroquinone monomethylether, parabenzoquinone, phenothiazine, and a mixture thereof, and comprises 0.01 to 1 weight % of the photopolymerizable urethane acrylate oligomer composition.

6. A resin composition for manufacturing optical fiber ribbon according to claim 1, wherein the monomer is selected from the group consisting of phenoxyethylacrylate, phenoxydiethylene glycol acrylate, phenoxytetraethylene glycol acrylate, phenoxyhexaethylene glycol acrylate, isobornyl acrylate, isobornyl methacrylate, N-vinylpyrrolidone, bisphenol ethoxylate diacrylate, ethoxylate phenol monoacrylate, polyethylene glycol 200 diacrylate, tripropylene glycol diacrylate, triethylpropane triacrylate, polyethyleneglycol diacrylate, ethoxylated trimethylol propane triacrylate, pentaerythritol tetraacrylate, 1,4-butanediol diacrylate, 1,6-hexanediol diacrylate, ethoxylated pentaerythritol tetraacrylate, 2-phenoxyethyl acrylate, ethoxylated bisphenol A diacrylate, and a mixture thereof, and comprises 15 to 50 weight % of the resin composition for manufacturing optical fiber ribbon.

7. A resin composition for manufacturing optical fiber ribbon according to claim 1, wherein the photoinitiator is selected from the group consisting of 1-hydroxy-cyclohexyl-phenyl-ketone, 2-methyl-1((4-(methylthio)phenyl)-2-morpholinopropan-1-one, a mixture of 1-hydroxy-cyclohexyl-phenyl-ketone and benzophenone, 2,2-dimethoxy-1,2-diphenylethane-1-one, 2-hydroxy-2-methyl-1-phenyl-propan-1-one, a mixture of bis(2,6-dimethoxybenzoyl)-2,4,4-trimethyl-phenyl-pentylphosphineoxide and 1-hydroxy-cyclohexyl-phenyl-ketone, a mixture of bis(2,6-dimethoxybenzoyl)-2,4,4-trimethyl-phenyl-pentylphosphineoxide and 2-hydroxy-2-methyl-1-phenyl-propan-1-one, and comprises 3 to 15 weight % of the resin composition for manufacturing optical fiber ribbon.

8. A resin composition for manufacturing optical fiber ribbon according to claim 1, wherein the leveling/defoaming agent is selected from the group consisting of an acrylated polydimethylsiloxane leveling agent, a polyacrylate leveling agent, a polyacrylate copolymer leveling agent, a polysiloxane defoaming agent, an acrylated polyester siloxane copolymer, and a polyester siloxane copolymer, and comprises 0.1 to 5 weight % of the resin composition for manufacturing optical fiber ribbon.

9. A resin composition for manufacturing optical fiber ribbon according to claim 1, wherein the antioxidant is selected from the group consisting of pentaerythritol tetrakis(3-(3,5-di-tert-butyl-4-hydroxyphenyl)propionate, pentaerythritol tetrakis(3-(3,5-di-tert-butyl-4-hydroxyphenyl)propionate, octadecyl-3-(3,5-di-tert.butyl-4-hydroxyphenyl)-propionate, and a mixture thereof, and comprises 0.1 to 5 weight % of the resin composition for manufacturing optical fiber ribbon.

10. A resin composition for manufacturing optical fiber ribbon according to claim 1, wherein the first polyol compound containing polydimethylsiloxane has a molecular weight between 100 and 10,000.

11. The resin composition according to claim 10, wherein the second polyol compound is polycaprolactone polyol.

12. A method of preparing resin for manufacturing optical fiber ribbon, comprising curing the resin composition of claim 1 by photo irradiation.

13. The method according to claim 12, wherein the resin has 23 dyne/cm² or less surface tension.

14. A resin for manufacturing optical fiber ribbon, wherein the resin is manufactured by the method of claim 12.

15. The resin according to claim 14, wherein the surface tension of the resin is 23 dyne/cm² or less.

16. The resin according to claim 14, wherein the resin has a shrinkage of 7.2% or less when measured by an ASTM (American Society for Testing and Materials) D-792 method.

* * * * *